United States Patent
Harwood et al.

(10) Patent No.: US 7,197,278 B2
(45) Date of Patent: Mar. 27, 2007

(54) METHOD AND SYSTEM FOR COMMUNICATING INFORMATION BETWEEN A VEHICULAR HANDS-FREE TELEPHONE SYSTEM AND AN EXTERNAL DEVICE USING A GARAGE DOOR OPENER AS A COMMUNICATIONS GATEWAY

(75) Inventors: Jody K. Harwood, Canton, MI (US); Jason G. Bauman, Huntington Woods, MI (US); Kenan Robert Rudnick, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 583 days.

(21) Appl. No.: 10/768,505

(22) Filed: Jan. 30, 2004

(65) Prior Publication Data
US 2005/0170777 A1    Aug. 4, 2005

(51) Int. Cl.
*H04B 7/00* (2006.01)
(52) U.S. Cl. .................. 455/41.2; 455/569.1; 455/66.1
(58) Field of Classification Search .............. 455/41.1, 455/41.2, 569.1, 66.1, 344, 345, 423
See application file for complete search history.

(56) References Cited

U.S. PATENT DOCUMENTS

| | | | |
|---|---|---|---|
| 4,961,212 A | 10/1990 | Marui et al. | |
| 5,353,376 A | 10/1994 | Oh et al. | |
| 5,864,603 A | 1/1999 | Haavisto et al. | |
| 6,041,300 A | 3/2000 | Ittycheriah et al. | |
| 6,131,044 A | 10/2000 | Ryu | |
| 6,167,251 A | 12/2000 | Segal et al. | |
| 6,212,408 B1 | 4/2001 | Son et al. | |
| 6,240,303 B1 | 5/2001 | Katzur | |
| 6,366,649 B1 | 4/2002 | Chun et al. | |
| 6,396,408 B2 * | 5/2002 | Drummond et al. | 340/815.4 |
| 6,449,496 B1 | 9/2002 | Beith et al. | |
| 6,505,159 B1 | 1/2003 | Theodore | |
| 2001/0000505 A1 | 4/2001 | Segal et al. | |
| 2001/0016501 A1 * | 8/2001 | King | 455/556 |
| 2001/0034754 A1 * | 10/2001 | Elwahab et al. | 709/201 |
| 2002/0107010 A1 * | 8/2002 | Witte et al. | 455/418 |
| 2002/0146999 A1 * | 10/2002 | Witte | 455/345 |
| 2003/0032460 A1 | 2/2003 | Cannon et al. | |
| 2003/0040903 A1 | 2/2003 | Gerson | |
| 2003/0064755 A1 | 4/2003 | Piwowarski | |
| 2003/0083113 A1 | 5/2003 | Chua et al. | |
| 2003/0101052 A1 | 5/2003 | Chen et al. | |

(Continued)

*Primary Examiner*—Matthew D. Anderson
*Assistant Examiner*—Sanh Phu
(74) *Attorney, Agent, or Firm*—Brooks Kushman P.C.

(57) ABSTRACT

A method and system for communicating information between a vehicle and a device located in a house. The system includes a vehicle appliance integrated in a vehicle. The vehicle appliance has a Bluetooth® enabled communications module. The system further includes a garage located in the vicinity of the house. The garage has a garage door opener mounted therein. The garage door opener has a Bluetooth® enabled communications module and a transceiver. The communications modules wirelessly communicate with one another when the vehicle is located in the vicinity of the garage. The system further includes a device such as a personal computer or a home security or lighting system located in the house. The device and the transceiver of the garage door opener wirelessly communicate with one another. The vehicle appliance and the device wirelessly communicate with one another via the communications module and the transceiver of the garage door opener.

6 Claims, 2 Drawing Sheets

U.S. PATENT DOCUMENTS

| | | |
|---|---|---|
| 2003/0114202 A1 | 6/2003 | Suh et al. |
| 2003/0135371 A1 | 7/2003 | Chang et al. |
| 2004/0110472 A1* | 6/2004 | Witkowski et al. ........ 455/41.2 |
| 2005/0014468 A1* | 1/2005 | Salokannel et al. ........ 455/41.2 |
| 2006/0050018 A1* | 3/2006 | Hutzel et al. ................. 345/60 |
| 2006/0184456 A1* | 8/2006 | de Janasz .................... 705/72 |

* cited by examiner

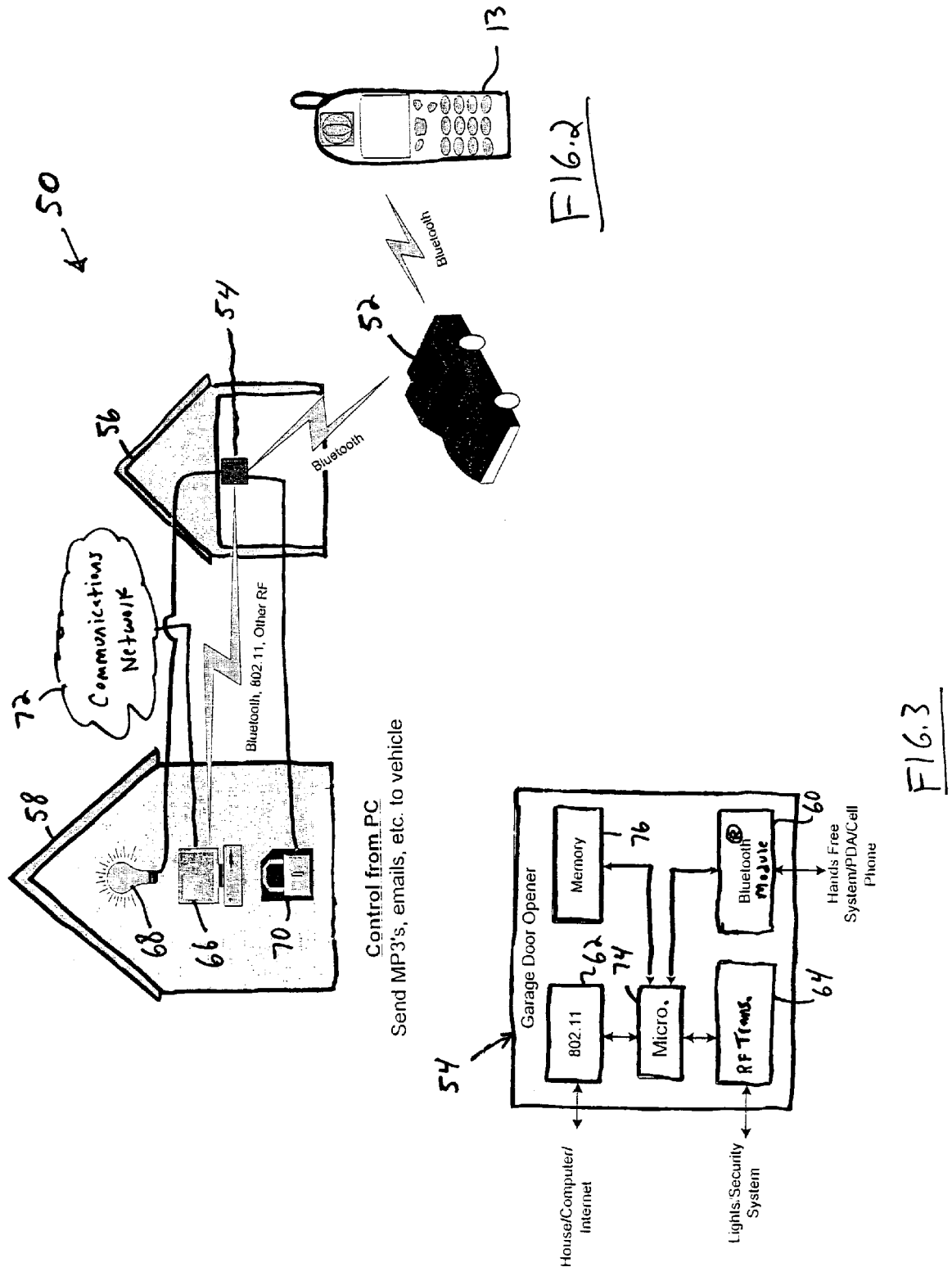

METHOD AND SYSTEM FOR COMMUNICATING INFORMATION BETWEEN A VEHICULAR HANDS-FREE TELEPHONE SYSTEM AND AN EXTERNAL DEVICE USING A GARAGE DOOR OPENER AS A COMMUNICATIONS GATEWAY

BACKGROUND OF THE INVENTION

1. Field of the Invention

The present invention relates generally to a vehicular hands-free telephone system. More particularly, the present invention relates to a method and system for communicating information between a vehicular hands-free telephone system and a device external to the vehicle using a transceiver mounted on a garage door opener mounted in a garage as a communications gateway therebetween.

2. Background Art

A conventional hands-free telephone system for a vehicle enables an operator of the vehicle such as the driver to talk on a cell phone while using both hands for driving the vehicle during a cell phone call. Typically, the driver manually uses keys on the cell phone to access functions, other than when answering a cell phone call, making a cell phone call, or re-dialing a recently dialed number. Conventional hands-free telephone systems employ a voice recognition module which enables the driver to answer and make cell phone calls and re-dial numbers using voice commands. As such, the advantages of conventional hands-free telephone systems for vehicles are added convenience and safety.

Certain vehicular, hands-free telephone systems employ Bluetooth™ communications technology. Such systems include a vehicle appliance which is typically configured as part of the operating panel of the vehicle. The vehicle appliance includes a Bluetooth® communications module for wirelessly communicating with a Bluetooth® enabled cell phone located somewhere in the vehicle. The vehicle appliance further includes a voice recognition module and other input interfaces such as keypads and buttons for receiving voice commands and other input commands from the driver regarding the use of the cell phone. The vehicle appliance is further connected to the vehicle electrical bus architecture in order to output voice and display information through the vehicle's radio speakers and radio display screen.

The communications module of the vehicle appliance can also wirelessly communicate with the cell phone using Bluetooth® communications if the cell phone is external to the vehicle as long as the cell phone is located in the immediate vicinity of the vehicle, i.e., within the communications range provided by the Bluetooth® communications. As such, the communications module can wirelessly communicate with other Bluetooth® enabled devices which are external to the vehicle but located in the immediate vicinity of the vehicle.

SUMMARY OF THE INVENTION

It is an object of the present invention to provide a method and system for communicating information between a vehicular hands-free telephone system and an external device using a garage door opener acting as a communications gateway therebetween.

It is another object of the present invention to provide a method and system for communicating information between a vehicular hands-free telephone system and a device external to the vehicle using a transceiver mounted on a garage door opener mounted in a garage as a communications gateway therebetween.

It is a further object of the present invention to provide a method and system for communicating information between a Bluetooth® enabled vehicular hands-free telephone system and an external device using a Bluetooth® enabled garage door opener as a communications gateway.

It is still another object of the present invention to provide a method and system for communicating information between a Bluetooth® enabled vehiclar hands-free telephone system and devices in a home using a Bluetooth® enabled garage door opener as a communications gateway.

It is still a further object of the present invention to provide a method and system for communicating information between a Bluetooth® enabled vehicular hands-free telephone system and a computer located external to the vehicle using a Bluetooth® enabled garage door opener as a communications gateway.

It is still yet another object of the present invention to provide a method and system for communicating information between a Bluetooth® enabled vehicular hands-free telephone system and a communications network such as the Internet using a computer located external to the vehicle and a Bluetooth® enabled garage door opener as a communications gateway.

It is still yet a further object of the present invention to provide a method and system for communicating information between a Bluetooth® enabled cell phone and a communications network such as the Internet using a Bluetooth® enabled vehicular hands-free telephone system, a computer located external to the vehicle, and a garage door opener as a communications gateway.

In carrying out the above objects and other objects, the present invention provides a system for communicating information between a vehicle and a device located in a house. The system includes a vehicle appliance integrated in a vehicle. The vehicle appliance has a Bluetooth® enabled communications module. The system further includes a garage located in the vicinity of the house. The garage has a garage door opener mounted therein. The garage door opener has a Bluetooth® enabled communications module and a transceiver. The communications module of the garage door opener and the communications module of the vehicle appliance are operable to wirelessly communicate with one another when the vehicle is located in the vicinity of the garage. The system further includes a device located in the house. The device and the transceiver of the garage door opener are operable to wirelessly communicate with one another. The vehicle appliance and the device wirelessly communicate with one another via the communications module and the transceiver of the garage door opener.

The vehicle appliance may further include a hands-free telephone system. In this case, the system further includes a Bluetooth® enabled cell phone operable to communicate with the communications module of the vehicle appliance in order for a driver of the vehicle to make a cell phone call using voice commands. The device and the cell phone wirelessly communicate with one another via the communications module of the vehicle appliance and the communications module and the transceiver of the garage door opener.

The device may be a personal computer connected to the Internet. In this case, the personal computer wirelessly communicates with the vehicle appliance via the communications module and the transceiver of the garage door opener in order to transfer information from the Internet to the vehicle appliance. Also, the vehicle appliance wirelessly communicates with the personal computer via the communications module and the transceiver of the garage door opener in order to access the Internet from the vehicle.

The device may be a home lighting device. In this case, the vehicle appliance wirelessly communicates with the communications module of the garage door opener in order to transmit a home lighting device command to the home lighting device. The transceiver of the garage door opener wirelessly transmits the home lighting device command to the home lighting device to control the operation of the home lighting device in accordance with the command.

The device may be a home security device. In this case, the vehicle appliance wirelessly communicates with the communications module of the garage door opener in order to transmit a home security device command to the home security device. The transceiver of the garage door opener wirelessly transmits the home security device command to the home security device to control the operation of the home security device in accordance with the command.

The transceiver of the garage door opener may be a Bluetooth® enabled transceiver or a wireless local area network (LAN) transceiver.

Further, in carrying out the above objects and other objects, the present invention provides a method for communicating information between a vehicle having a vehicle appliance and a device located in a house. The method is for use with a garage door opener of a garage located in the vicinity of the house. The method includes providing the vehicle appliance with a Bluetooth® enabled communications module. The method further includes providing the garage door opener with a Bluetooth® enabled communications module and a transceiver. The communications module of the garage door opener and the communications module of the vehicle appliance are operable to wirelessly communicate with one another when the vehicle is located in the vicinity of the garage. The device and the transceiver of the garage door opener are operable to wirelessly communicate with one another. The method further includes parking the vehicle in the garage and then wirelessly communicating information between the vehicle appliance and the device via the communications module and the transceiver of the garage door opener.

The device may be a personal computer connected to the Internet. In this case, the method further includes using the personal computer to access information from the Internet and then wirelessly communicating the accessed information from the personal computer to the communications module of the vehicle appliance via the communications module and the transceiver of the garage door opener. The accessed information may include a custom vehicle horn sound. In this case, the method further includes transmitting a command from the vehicle appliance to a horn of the vehicle via a vehicle electrical bus in order to control the horn to blast sounds in accordance with the custom vehicle horn sound. The accessed information may include a custom turn signal sound. In this case, the method further includes transmitting a command from the vehicle appliance to a speaker of the vehicle via a vehicle electrical bus in order to control the speaker to output a sound in accordance with the custom turn signal sound as a turn signal of the vehicle operates.

The method may also include wirelessly communicating information from the communications module of the vehicle appliance to the personal computer via the communications module and the transceiver of the garage door opener, and then using the personal computer to transfer the communicated information to the Internet for access by a third party. In this case, the communicated information includes vehicle diagnostics and the third party is a vehicle service dealer.

The device may include a personal computer connected to the Internet and a home security system (or a home lighting system). In this case, the method further includes transferring, from the vehicle appliance to the personal computer via the Internet, a command to control the home security system (the home lighting system). The command is then wirelessly communicated from personal computer to the transceiver of the garage door opener. The command is then wirelessly communicated from the transceiver of the garage door opener to the home security system (the home lighting system) in order to control the operation of the home security system (the home lighting system) in accordance with the command.

BRIEF DESCRIPTION OF THE DRAWINGS

FIG. 2 illustrates a block diagram of a system for communicating information between the vehicular hands-free telephone system and a device external to the vehicle using a garage door opener as a communications gateway therebetween in accordance with the present invention; and FIG. 3 illustrates a block diagram of the garage door opener in accordance with the present invention.

DETAILED DESCRIPTION OF THE PREFERRED EMBODIMENT(S)

Figure 1:
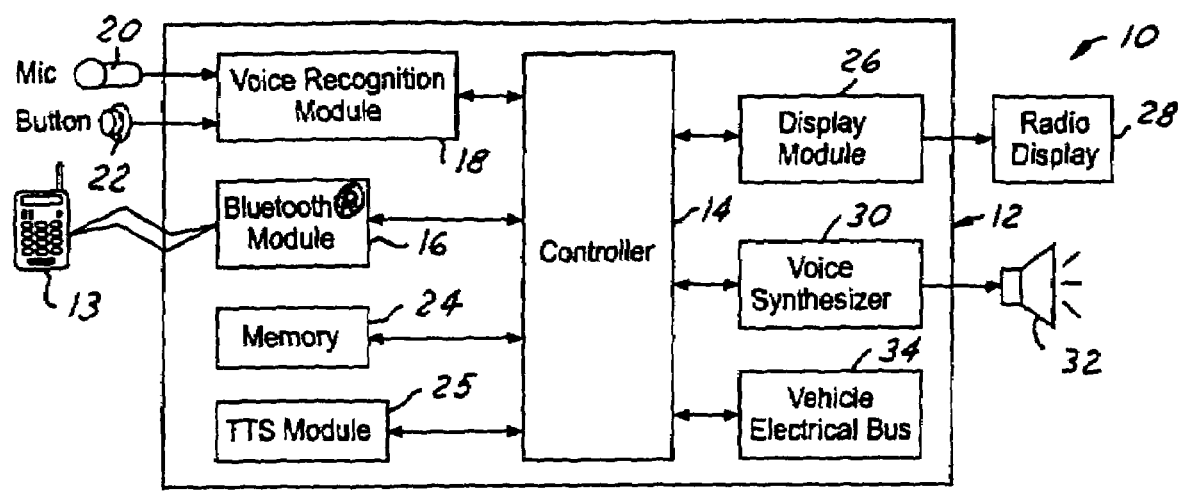
FIG. 1 illustrates a block diagram of a hands-free, Bluetooth™ enabled telephone system for a vehicle in accordance with the present invention.

Referring now to FIG. 1, a block diagram of a hands-free, Bluetooth® enabled telephone system 10 for a vehicle in accordance with the present invention is shown. Telephone system 10 includes a vehicle appliance 12 which is integrated as part of a vehicle 52 (shown in FIG. 2). Vehicle appliance 12 enables an operator of vehicle 52 such as a driver to use a Bluetooth® enabled device such as a cell phone 13 located somewhere in or near the vicinity of the vehicle in a hands-free manner. Vehicle appliance 12 enables the driver to control the operation of cell phone 13 using voice commands. Through the use of Bluetooth® communications technology, vehicle appliance 12 and cell phone 13 wirelessly transmit signals between themselves to communicate with one another.

Vehicle appliance 12 includes a controller 14 which controls the overall operation of the vehicle appliance. Vehicle appliance 12 further includes a Bluetooth® communications module 16 which wirelessly communicates with Bluetooth® enabled devices such as cell phone 13 located in the vicinity of vehicle 52.

Vehicle appliance 12 also includes a voice recognition module 18. Voice recognition module 18 is connected to a microphone 20 for receiving voice communications including voice commands from the driver. Voice recognition module 18 transfers voice communications from the driver via a microphone 20 to controller 14. Voice recognition module 18 translates voice commands from the driver into corresponding electrical signals for use by controller 14. For example, voice recognition module 18 translates the voice command "dial" into a corresponding electrical command signal for use by controller 14. Similarly, voice recognition module 18 translates numeric characters spoken by the driver into corresponding electrical information signals for use by controller 14. Voice recognition module 18 is connected to an input button 22 for receiving manual commands from the driver. For example, the driver presses input button 22 when the driver desires vehicle appliance 12 go into certain modes such as the mode for making a cell phone call to an external phone using cell phone 13.

Vehicle appliance 12 further includes memory 24. Memory 24 stores information in a phonebook(s) which may also be stored in a phonebook of cell phone 13 or other external devices. Such information includes a listing of names and associated telephone numbers. Vehicle appliance 12 also includes a display module 26 which is connected to a display of the vehicle such as an LCD display 28 of the vehicle's radio via vehicle electrical bus architecture 34 for displaying information to the driver.

Vehicle appliance 12 also includes a voice synthesizer 30 which generates electronic voice signals in response to corresponding electrical signals generated by controller 14 during operation of telephone system 10. Voice synthesizer 30 is connected to a speaker 32 mounted in the vehicle such as the vehicle's radio speakers via vehicle electrical bus 34. Voice synthesizer 30 outputs the electronic voice signals to radio speaker 32 for the driver to hear. For example, such outputted electronic voice signals may be "Dialing John" when cell phone 13 is dialing John's telephone number. Vehicle appliance 12 further includes a text-to-speech (TTS) module 25 for converting text messages into speech for output by voice synthesizer 30 and for storage in memory 24.

Referring now to FIGS. 2 and 3, with continual reference to FIG. 1, a block diagram of a system 50 for communicating information between vehicle appliance 12 and a device external to vehicle 52 using a garage door opener 54 acting as a communications gateway therebetween in accordance with the present invention is shown in FIG. 2. FIG. 3 illustrates a block diagram of garage door opener 54 in accordance with the present invention.

Garage door opener 54 generally enables wireless communications between devices and vehicle appliance 12 by acting as a wireless communications gateway between the devices and the vehicle appliance. The devices communicating with vehicle appliance 12 via garage door opener 54 are most likely to be located outside of vehicle 52.

Garage door opener 54 is mounted on the ceiling of a garage 56 of a home 58. Garage door opener 54 is configured to perform functions of a typical garage door opener such as opening and closing the door of garage 54 in response to receiving wireless garage door command signals. Garage door opener 54 is operable to wirelessly communicate with vehicle appliance 12 using Bluetooth® communications technology. Garage door opener 54 is also operable to wirelessly communicate with devices external to vehicle 52 such as devices located in home 58 using Bluetooth® communications technology, wireless local area network (LAN) communications technology such as 802.11, and other radio frequency (RF) communications technologies.

In order to wirelessly communicate with vehicle appliance 12, garage door opener 54 includes a Bluetooth® enabled communications module 60. Communications module 60 of garage door opener 54 wirelessly communicates with communications module 16 of vehicle appliance 12 using Bluetooth® wireless communication technology. This communication takes place when vehicle 52 is located near the vicinity of garage door opener 54. This criteria is satisfied when vehicle 52 is parked within garage 56 and thereby located underneath garage door opener 54.

In order to wirelessly communicate with devices located in home 58, garage door opener 54 includes a wireless LAN transceiver 62 and a RF transceiver 64 in addition to communications module 60. LAN transceiver 62 preferably employs 802.11 communications technology. As an example, the devices in home 58 include a personal computer 66, a home lighting device 68, and a home security device 70. Personal computer 66 is preferably connected to a communications network such as the Internet 72 using typical Internet service connections. Garage door opener 54 wirelessly communicates with any one of these devices 66, 68, and 70 located in home 58 using any one of transceivers 60, 62, and 64. Preferably, garage door opener 54 wireless communicates with home devices 66, 68, and 70 using LAN transceiver 62. Garage door opener 54 further includes a controller 74 which controls the overall operation of the garage door opener and also includes memory 76.

As indicated above, garage door opener 54 generally enables communications between any of the devices located in home 58 such as computer 66, home lighting device 68, and home security device 70 with vehicle appliance 12. For example, computer 66 and vehicle appliance 12 may wirelessly communicate with one another by using garage door opener 54 as a wireless communications gateway. To this end, computer 66 wirelessly communicates with LAN transceiver 62 of garage door opener 54. In turn, communications module 16 of vehicle appliance 12 communicates with communications module 60 of garage door opener. As such, computer 66 and vehicle appliance 12 wirelessly communicate with one another via LAN transceiver 62 and communications module 60 of garage door opener 54. Thus, garage door opener 54 acts as a communications gateway between computer 66 and vehicle appliance 12.

Computer 66 and vehicle appliance 12 may communicate with one another via garage door opener 54 for a host of reasons. For instance, computer 66 may communicate with vehicle appliance 12 via garage door opener 54 in order to download stored information such as telephone numbers, contact information, etc., into memory 24 of the vehicle appliance for use in making cell phone calls. In turn, this information stored in memory 24 may be wirelessly communicated from communications module 16 to cell phone 13 for storage in the cell phone memory. As another example, computer 66 may communicate with vehicle appliance 12 via garage door opener 54 in order to download navigation information such as maps into memory 24 of the vehicle appliance. Such maps may be operational with a global positioning system (GPS) in vehicle 52 in order to provide hands-free navigation services to the driver. Such maps may also be displayed on display devices within vehicle 52 for the driver to access.

Computer 66 is connected to the Internet 72 in order to access the Internet as is typically done with computers. As such, computer 66 may communicate with vehicle appliance 12 via garage door opener 54 in order to wirelessly transmit information obtained from the Internet to the vehicle appliance. For example, computer 66 may communicate with vehicle appliance 12 in order to download music files, video files, and the like obtained from the Internet 72 into memory 24 of vehicle appliance 12. The driver may then operate vehicle appliance 12 to play the music files stored in memory 24 over the vehicle speakers 32. Likewise, the driver may operate vehicle appliance 12 to play the video files stored in memory 24 over a display device. When transferring any information between computer 66 and vehicle appliance 12 using garage door opener 54 as a communications gateway, memory 76 of the garage door opener may act as a buffer in order to facilitate the communications.

Likewise, vehicle appliance 12 may communicate with computer 66 via garage door opener 54 for a host of reasons. For instance, vehicle appliance 12 may communicate vehicle diagnostic information to computer 66 via garage door opener 54. Vehicle diagnostics may include information regarding engine conditions, brake and tire wear, VIN, mileage, oil change maintenance, etc. Such vehicle diagnostic information may be accessed from vehicle electrical bus 34. In turn, computer 66 may analyze the vehicle diagnostic information to determine whether any vehicle service is required or suggested. If so, computer 66 may provide an appropriate indication to the driver when the driver is operating the computer. Further, as computer 66 is connected to the Internet, computer 66 may automatically transmit such vehicle diagnostic information to a vehicle service dealer via the Internet. In response, the service dealer may advise the driver to bring vehicle 52 in for service and the dealer will already have the diagnostic information of the vehicle. Further, the vehicle service dealer may communicate updated vehicle software pertaining to any of the components of the vehicle to computer 66 via the Internet 72. In turn, computer 66 transfers the updated software to vehicle appliance 12 via garage door opener 54. Vehicle appliance 12 may then use vehicle electrical bus 34 to transfer the updated software to the appropriate vehicle component.

Vehicle appliance 12 may communicate with the Internet 72 via garage door opener 56 and computer 66 in order to enable the driver to access the Internet from vehicle 52 while the vehicle is located in the vicinity of garage 56. In this case, Internet pages downloaded to vehicle appliance 12 from the Internet 72 via garage door opener 56 and computer 66 may be displayed on a display device in vehicle 52 while the driver is accessing the Internet. Vehicle appliance 12 may also wirelessly communicate such Internet pages to cell phone 13 for display on the cell phone. As an example of information accessed from the Internet 72, vehicle appliance 12 may download customizable horn tunes, turn signal noises, etc., from the Internet via garage door opener 56 and computer 66. Using this downloaded information, the vehicle's horn may then honk using a customizable horn tune and the vehicle speakers may emit a customized sound for the driver to hear each time the vehicle turn signals go on and off. Both the vehicle's horn and the vehicle's turn signal speakers are connected to vehicle electrical bus 34.

Vehicle appliance 12 may also communicate to home lighting device 68 via garage door opener 54 while vehicle 52 is located in the vicinity of garage 56. For example, the driver may use vehicle appliance 12 to communicate with home lighting device 68 via garage door gateway 54 to turn on lights in the home while the driver is in the vehicle and is ready to pull the vehicle out of garage 54. Likewise, the driver may also use vehicle appliance 12 to communicate with home security device 70 via garage door gateway 54 to turn on the security system after the driver has just pulled out the vehicle from garage 56.

If vehicle 52 is out of the vicinity of garage door opener 54, the driver may use cell phone 13 to make a cell phone call with computer 66 via the Internet 72 in order to establish communications with garage door opener 54. For instance, the driver may indicate to computer 66 that the lights of the home need to be turned on. In this instance, computer 66 conveys this information to garage door opener 54 which in turn controls home lighting device 68 accordingly. Similarly, the driver may use cell phone 13 to make a cell phone with computer 66 via the Internet 72 in order to advise the computer that home security device 70 needs to be turned on. In this instance, computer 66 conveys this information to garage door opener 54 which in turn controls home security device 70 accordingly.

In addition to making a cell phone call to computer 66 regarding the control of either home lighting and security device 68 and 70, the driver may make the cell phone call to the computer to inquire about the status of either of these devices. In response, computer 66 conveys the monitoring request to garage door opener 54 which in turn communicates with home lighting and security devices 68 and 70 regarding same. Garage door opener 54 then communicates the monitoring information to computer 66 which in turn communicates this information to cell phone 13 via the Internet 72 for the driver to hear.

Thus, it is apparent that there has been provided, in accordance with the present invention, a method and system for communicating information between a vehicular hands-free telephone system and a device external to the vehicle using a transceiver mounted on a garage door opener mounted in a garage as a communications gateway therebetween that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for communicating information between a vehicle having a vehicle appliance and a device located in a house, wherein the device is a personal computer connected to the Internet, the method for use with a garage door opener of a garage located in the vicinity of the house, the method comprising:

providing the vehicle appliance with a Bluetooth® enabled communications module;

providing the garage door opener with a Bluetooth® enabled communications module and a transceiver, wherein the communications module of the garage door opener and the communications module of the vehicle appliance are operable to wirelessly communicate with one another when the vehicle is located in the vicinity of the garage, wherein the personal computer and the transceiver of the garage door opener are operable to wirelessly communicate with one another;

parking the vehicle in the garage;

wirelessly communicating information between the vehicle appliance and the personal computer via the communications module and the transceiver of the garage door opener;

wirelessly communicating information including vehicle diagnostics from the communications module of the vehicle appliance to the personal computer via the communications module and the transceiver of the garage door opener; and using the personal computer to transfer the communicated information including the vehicle diagnostics to the Internet for access by a third party, wherein the third party is a vehicle service dealer.

2. The method of claim 1 further comprising:

using the personal computer to access information from the Internet; and wirelessly communicating the accessed information from the personal computer to the communications module of the vehicle appliance via the communications module and the transceiver of the garage door opener.

3. A method for communicating information between a vehicle having a vehicle appliance and a device located in a house, the method for use with a garage door opener of a garage located in the vicinity of the house, the method comprising:

providing the vehicle appliance with a Bluetooth® enabled communications module;

providing the garage door opener with a Bluetooth® enabled communications module and a transceiver, wherein the communications module of the garage door opener and the communications module of the vehicle appliance are operable to wirelessly communicate with one another when the vehicle is located in the vicinity of the garage, wherein the device and the transceiver of the garage door opener are operable to wirelessly communicate with one another;

parking the vehicle in the garage;

wirelessly communicating information between the vehicle appliance and the device via the communications module and the transceiver of the garage door opener;

using the device to access information from the Internet, wherein the accessed information includes a custom vehicle horn sound;

wirelessly communicating the accessed information from the device to the communications module of the vehicle appliance via the communications module and the transceiver of the garage door opener; and transmitting a command from the vehicle appliance to a horn of the vehicle via a vehicle electrical bus in order to control the horn to blast sounds in accordance with the custom vehicle horn sound.

4. A method for communicating information between a vehicle having a vehicle appliance and a device located in a house, the method for use with a garage door opener of a garage located in the vicinity of the house, the method comprising:

providing the vehicle appliance with a Bluetooth® enabled communications module;

providing the garage door opener with a Bluetooth® enabled communications module and a transceiver, wherein the communications module of the garage door opener and the communications module of the vehicle appliance are operable to wirelessly communicate with one another when the vehicle is located in the vicinity of the garage, wherein the device and the transceiver of the garage door opener are operable to wirelessly communicate with one another;

parking the vehicle in the garage;

wirelessly communicating information between the vehicle appliance and the device via the communications module and the transceiver of the garage door opener;

using the device to access information from the Internet, wherein the accessed information includes a custom turn signal sound;

wirelessly communicating the accessed information from the device to the communications module of the vehicle appliance via the communications module and the transceiver of the garage door opener; and transmitting a command from the vehicle appliance to a speaker of the vehicle via a vehicle electrical bus in order to control the speaker to output a sound in accordance with the custom turn signal sound as a turn signal of the vehicle.

5. The method of claim 1 wherein the personal computer is connected to the Internet and a home security system, the method further comprising:

transferring, from the vehicle appliance to the personal computer via the Internet, a command to control the home security system;

wirelessly communicating the command from the personal computer to the transceiver of the garage door opener; and wirelessly communicating the command from the transceiver of the garage door opener to the home security system in order to control the operation of the home security system in accordance with the command.

6. The method of claim 1 wherein the personal computer is connected to the Internet and a home lighting system, the method further comprising:

transferring, from the vehicle appliance to the personal computer via the Internet, a command to control the home lighting system;

wirelessly communicating the command from the personal computer to the transceiver of the garage door opener; and wirelessly communicating the command from the transceiver of the garage door opener to the home lighting system in order to control the operation of the home lighting system in accordance with the command.

* * * * *